April 1, 1969 G. K. FARNEY 3,436,594

SLOW WAVE CIRCUIT HAVING AN ARRAY OF HALF WAVE RESONATORS COUPLED VIA AN ARRAY OF QUARTER WAVE RESONATORS

Filed Dec. 15, 1965 Sheet 1 of 2

INVENTOR.
GEORGE K. FARNEY

BY Harry E. Aine

ATTORNEY

INVENTOR.
GEORGE K. FARNEY
BY Harry E. Aine
ATTORNEY

United States Patent Office 3,436,594
Patented Apr. 1, 1969

3,436,594

SLOW WAVE CIRCUIT HAVING AN ARRAY OF HALF WAVE RESONATORS COUPLED VIA AN ARRAY OF QUARTER WAVE RESONATORS

George K. Farney, New Providence, N.J., assignor to S-F-D Laboratories, Inc., Union, N.J., a corporation of New Jersey Filed Dec. 15, 1965, Ser. No. 523,490
Int. Cl. H01j 25/50
U.S. Cl. 315—39.77 8 Claims

ABSTRACT OF THE DISCLOSURE

Slow wave circuits and microwave tubes utilizing same are disclosed. The slow wave circuits include an array of half wave resonators formed by an array of bars or other elongated conductive elements shorted together at both of their common ends to define the array of half wave resonators. Microwave energy is coupled to and from the array of half wave resonators via the intermediary of an array of quarter wave resonators formed by an array of quarter wavelength conductive members shorted together at one common end and connected at the other common end to the elongated conductive elements of the array of half wave resonators intermediate the length of the shorted elongated elements. In a preferred embodiment, a circular electric mode resonator is coupled to the composite slow wave circuit via the intermediary of coupling slots communicating through the shorted ends of the quarter wave resonators via an array of coupling slots communicating with alternate quarter wave resonators. Electromagnetic interaction is obtained between a wave traveling on the half wave resonator array and an electron stream disposed adjacent the array of half wave resonators.

Figure 1:
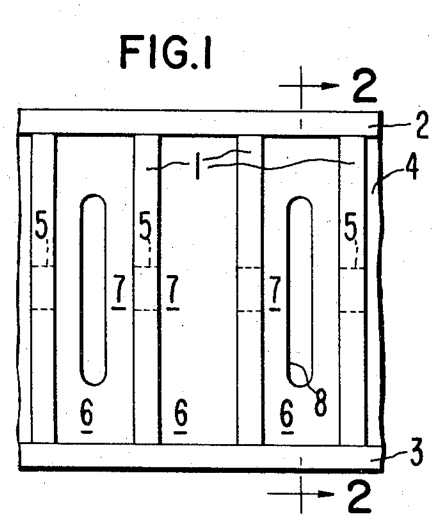

Heretofore, bar circuits, i.e., an array of coupled bars defining a periodic slow wave circuit, have been employed in magnetron tubes both of the oscillator and amplifier type for providing a high thermal capacity circuit due to the ease with which the bar circuit may be cooled. However, bar circuits have not, heretofore, been employed in coaxial type magnetrons (a type of magnetron having the $\pi$ mode of a magnetron interaction slow wave circuit tightly coupled to a coaxially disposed circular electric mode cavity or wave supporting structure) because of the lack of a practical coupling means between the bars of the bar circuit and the circular electric mode supporting structure.

In the present invention an array of conductive members shorted at one end, preferably vane shaped, are connected to the bars of the bar array, preferably centrally of the bars. In the composite circuit formed by the connected bar and vane arrays, the vanes provide means for coupling energy onto or off of the bar array in the manner vane arrays have been conventionally coupled. In addition, in certain preferred embodiments, the vanes provide physical support for the bar array and facilitate cooling of the bars by providing an additional heat path to a heat sink. The vane array coupled to the bar circuit is especially suited for coaxial magnetrons because it permits the circular electric mode structure to be readily coupled to the $\pi$ mode of the bar array via conventional techniques developed for coupling vane circuits, such as an array of coupling slots communicating with alternate slot resonators defined between adjacent vanes.

The principal object of the present invention is the provision of an improved periodic microwave circuit and tubes using same.

One feature of the present invention is the provision of a composite periodic circuit including an array of conductive elements such as vanes, rods, stubs, chokes, and the like which are shorted together at one end and arranged such that they are connected at their nonshorted ends to the central regions of an array of bars, whereby wave energy coupling to said bars is facilitated.

Another feature of the present invention is the same as the preceding feature wherein said bar array includes a pair of strapping circuit members coupled thereto and extending along the periodic circuit defined by the bars and wherein the pair of strapping members are selected from the class consisting of, helices, alternate bar connected straps, and capacitively coupled alternate bar connected straps, whereby the dispersion characteristics of the composite bar circuit may be shaped as desired.

Another feature of the present invention is the same as any one or more of the preceding features wherein said composite periodic circuit is coupled to a circular electric mode supporting structure via the intermediary of array of coupling devices directly communicating between the fields of the circular electric mode structure and the slots defined between adjacent ones of said shorted conductive elements, whereby the $\pi$ mode of the composite bar circuit may be locked to the circular electric mode.

Figure 2:
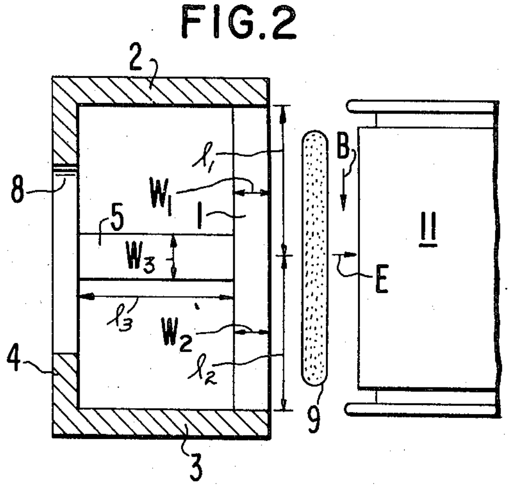
Figure 3:
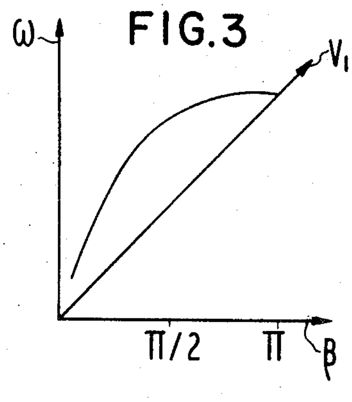
Figure 4:
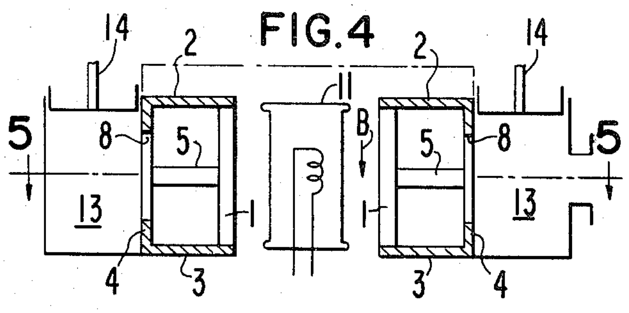
Figure 5:
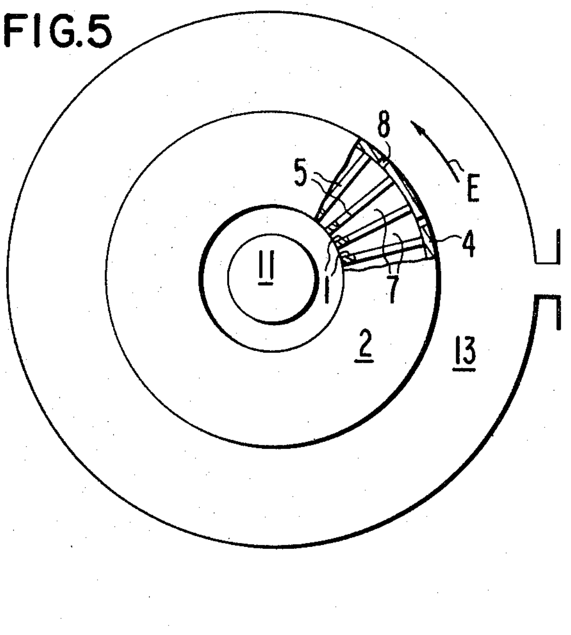
Figure 6:
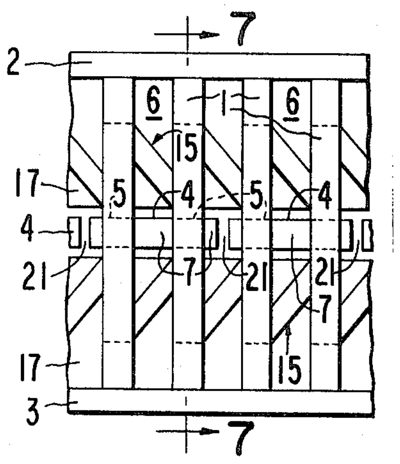
Figure 7:
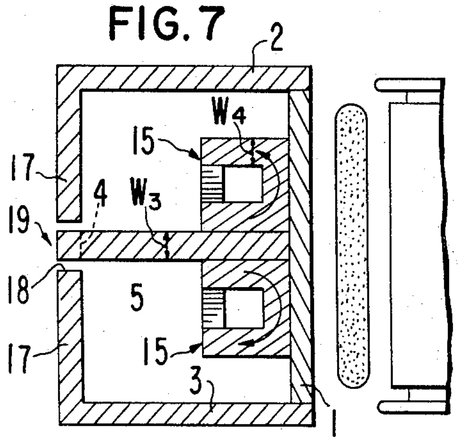
Figure 8:
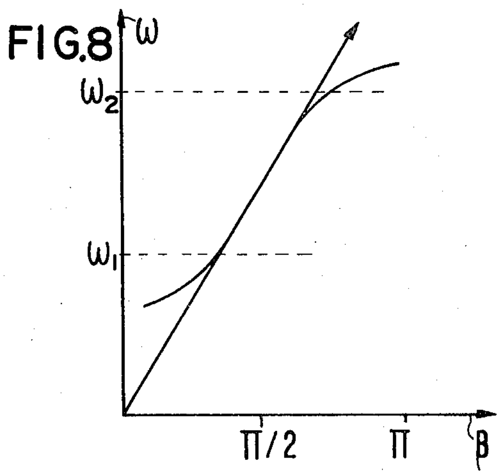
Figure 9:
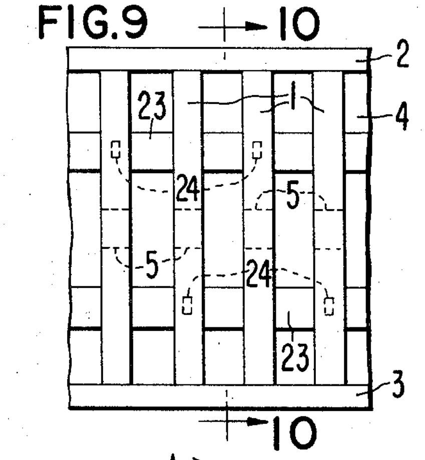
Figure 10:
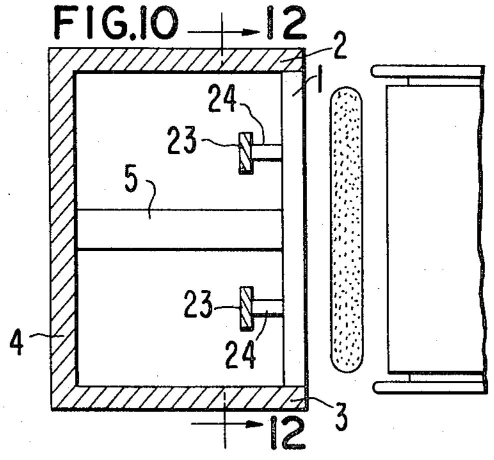
Figure 11:
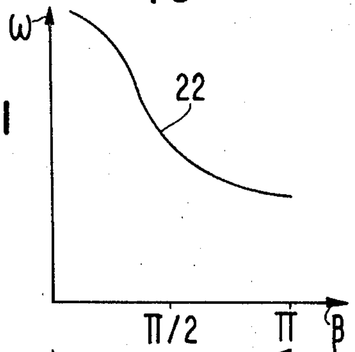
Figure 12:
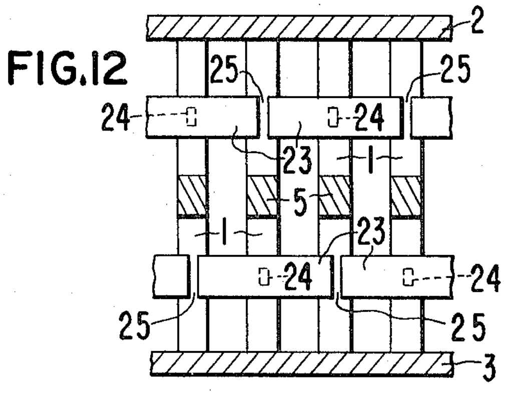

Other features and advantages of the present invention will become apparent upon a perusal of the following specification taken in connection with the accompanying drawings wherein:

FIG. 1 is a side elevational view of a bar circuit embodying features of the present invention, FIG. 2 is a transverse sectional view through the structure of FIG. 1 taken along line 2—2 in the direction of the arrows, FIG. 3 is an $\omega$–$\beta$ diagram for the circuit of FIG. 1 showing the dispersion characteristics thereof, FIG. 4 is a schematic longitudinal sectional view of a coaxial magnetron embodying the circuit features of the present invention, FIG. 5 is a sectional view of the structure of FIG. 4 taken along line 5—5 in the direction of the arrows, FIG. 6 is a side elevational view of a dual helix coupled bar circuit embodying the features of the present invention, FIG. 7 is a transverse sectional view of the structure of FIG. 6 taken along line 7—7 in the direction of the arrows, FIG. 8 is an $\omega$–$\beta$ diagram showing the dispersion characteristics for the circuit of FIGS. 6 and 7, FIG. 9 is a side elevational view of a dual alternate strapped bar circuit embodying the features of the present invention, FIG. 10 is a transverse sectional view of the structure of FIG. 9 taken along line 10—10 in the direction of the arrows, FIG. 11 is an $\omega$–$\beta$ diagram showing the dispersion characteristics for the circuit of FIGS. 9 and 10, FIG. 12 is a side sectional view of an alternative $C_{1-3}$ coupled strapped bar circuit embodying features of the present invention and corresponding to a view of the circuit of FIG. 10 taken along line 12—12 in the direction of the arrows.

Figure 13:
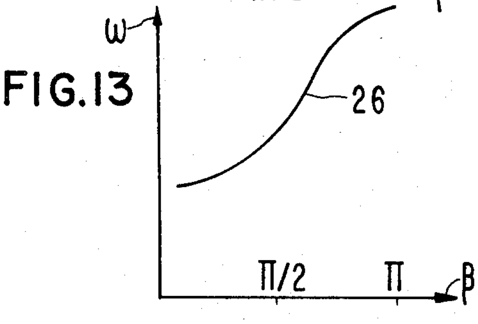

FIG. 13 is a $\omega$-$\beta$ diagram showing the disperson characteristics for the circuit of FIG. 12.

Referring now to FIGS. 1 and 2, there is shown the vane coupled bar circuit of the present invention. More specifically, a bar circuit is formed by an array of parallel directed bar members 1 as of copper shorted at their ends by a pair of conductive wall members 2 and 3 as of copper. The end wall members 2 and 3 may extend back and connect to a back wall member 4 as of copper. An array of conductive stub members 5 as of copper interconnect the back wall 4 with the central region of the bars 1. The conductive members 5 may take the form of vanes, bars, tubes, or the like. In a preferred embodiment (see FIG. 2), the stubs 5 have a length $l_3$ which is approximately the same as the length $l_1$ and $l_2$ from the ends of the bars to the point where the stub 5 connects to the bars 1. In addition, in a preferred embodiment, the bars 1 have a width, $W_1$ and $W_2$, which is within the range of ½ to twice the width $W_3$ of the stubs 5.

The space between adjacent bar members 1 forms a slot resonator having a resonant frequency corresponding to one-half an electrical wavelength long. Therefore, the array of bars 1 also defines an array of slot resonators 6 in the spaces between adjacent bar members 1. Likewise, the spaces between adjacent stubs 5 defines an array of slot resonators 7 which have a resonant frequency corresponding to $l_3$ being approximately an electrical quarter-wavelength. Energy may be coupled onto the bar circuit or out of the bar circuit via the intermediary of a coupling slot 8 coupling through the back wall 4 and communicating with a slot resonator 7 in the spaces between adjacent vane or stub members 5.

Electronic interaction with the circuit of FIGS. 1 and 2 is preferably obtained between the electric fields of the slot resonators 6 and a stream of charged particles such as electrons in the region adjacent the outer edges of the bars 1, as indicated by the hatched area 9 of FIG. 2.

The circuit of FIGS. 1 and 2 has a fundamental forward wave dispersion characteristic as shown in FIG. 3 and is especially suited for magnetron type interaction such as is obtained when the bar circuit is operated at anode potential in spaced relation from a cathode electrode 11 with an axially directed magnetic field, B, passing through the electronic interaction region at right angles to the electric vector, E. The circuit of FIGS. 1 and 2 has good thermal properties because thermal energy tending to collect on the bar circuit may be readily conducted therefrom to the heat sink walls 2, 3 and 4 via the intermediary of the conductive stub members 5 and bars 1. Also the circuit of FIGS. 1 and 2 may coaxially surround the cathode electrode 11 as in a conventional normal magnetron or may be surrounded by the coaxially disposed cathode 11 as in a reverse magnetron geometry.

Furthermore, the moding problems tending to be encountered in magnetrons having a large number of slot resonators 6 can be overcome to some extent and the circuit may be tuned by utilizing the composite circuit of FIG. 1 in a coaxial magnetron geometry wherein alternate slot resonators 6 are coupled to the circular electric mode of a circular electric mode structure via the intermediary of an array of axially directed coupling slots 8. Such a tube is shown in FIGS. 4 and 5. In FIGS. 4 and 5 the same numerals have been used to identify the same parts of the circuit as shown in FIGS. 1 and 2. The back wall 4 of the circuit is surrounded by a coaxial circular electric mode cavity resonator 13 closed at one end by an annular axially translatable tuning plunger 14 for changing the resonant frequency of the coaxial cavity 13.

The circular electric mode of the cavity 13 is phase locked to the $\pi$ mode of the bar type magnetron interaction circuit via the intermediary of the coupling slots 8 communicating with alternate vane resonator slots 7 in the manner as indicated in FIG. 5. Although the particular coaxial magnetron geometry shown in FIGS. 4 and 5 is of the normal type, i.e., the magnetron interaction circuit surrounds the cathode 11, the vane coupled bar circuit geometry is just as well suited for the reverse magnetron geometry wherein the cathode electrode 11 surrounds the magnetron interaction region and the magnetron interaction region, in turn, surrounds a circular electric mode cavity or other wave supporting structure. Such other wave supporting structure would include a circular electric guide, in the case of an amplifier, with an axially directed coupling slots 8 providing the wave energy communication between the circular electric mode structure and the magnetron interaction region.

Referring now to FIGS. 6 and 7, there is shown an alternative embodiment of the present invention. In this embodiment, the stub coupled bar array of FIG. 2 includes a pair of axially directed helices 15 which serve to couple together adjacent bars 1 of the bar circuit. The helices 15 extend along the direction of circuit development advancing with equal pitch but of opposite sense of rotation (contrawound) in order to prevent setting up of certain anti-symmetric modes of oscillation associated with the vane and bar members. In the preferred embodiment of the structure of the circuit of FIGS. 6 and 7, the helices 15 preferably have a conductor width, $W_4$, which is comparable to the width $W_3$ of the vane members 5 in order to obtain wide band operation of the circuit as shown in FIG. 8. The helices 15 serve to raise the high frequency cut off $\omega_2$ of the composite circuit thereby providing a very substantial bandwidth from $\omega_1$ to $\omega_2$. The duel helix coupled bar circuit forms the subject matter of and is claimed in copending U.S. application No. 514,088, filed Dec. 15, 1965 and assigned to the same assignee as the present invention.

The circuit of FIGS. 6 and 7 illustrates another embodiment of the present invention, namely, that the shorted ends of the vanes 5 need not provide a thermal heat sink for the bar circuit 1 but may be used primarily for the purpose of coupling the bar circuit to a circular electric mode such as the $TE_{0,1,n}$ mode of a circular electric mode supporting structure defined by the axially directed back wall 17 of the composite circuit. In this instance, the long axially directed coupling slots 8 have been replaced by an annular gap 18 in the wall 17 with the shorted ends 4 of the vanes 5 projecting into or through the annular gap 18. Coupling slots 21 are then provided in the back wall 4 of alternate quarter wave slot resonators 7 communicating between the circular electric mode structure and the slot resonators 7 through the shorting back wall portion 4. In this manner the circular electric mode of the circular electric mode structure is phase locked to the $\pi$ mode of the bar circuit while eliminating the long coupling slots 8 and their attendant slot modes of resonance which tend to interfere with proper operation of coaxial magnetron tubes. The feature of coupling a magnetron interaction circuit to a circular electric mode structure by an array of quarter wave slot resonators communicating through a slotted wall projecting into or through an annular gap forms the subject matter of and is claimed in copending U.S. application 516,631, filed Dec. 27, 1965 and assigned to the same assignee as the present invention.

Referring now to FIGS. 9 and 10, there is shown an alternative vane coupled bar circuit incorporating features of the present invention. More particularly, this circuit is substantially the same as the circuit of FIGS. 1 and 2 with the exception that a pair of conductive straps 23 have been provided on the back side of the bar array with each strap of the pair of straps being connected via conductive tabs 24 to alternate ones of the bars of the bar array. When the bar array is strapped in this manner, the fundamental forward wave characteristic of the bar circuit is altered to a backward fundamental wave characteristic as shown by the dispersion curve 22 of FIG. 11. Circuits having the backward fundamental dispersion curve are useful as backward wave amplifiers or as magnetron oscillator circuits. As found with the other vane coupled bar circuits, the vanes 5 serve to increase the mechanical strength and thermal capacity of the bar circuit of FIGS. 9 and 10.

Referring now to FIG. 12 there is shown an alternative embodiment of the present invention which is substantially the same as the circuit of FIGS. 9 and 10 with the exception that the straps 23 are provided with an array of slots 25 intermediate their point of connection to alternate bars 1. This causes the straps 23 to be capacitively coupled together rather than conductively connected thereby altering the dispersion characteristics of the strapped bar circuit from a fundamental backward wave to a fundamental forward wave dispersion characteristic 26 as shown in the $\omega$-$\beta$ diagram of FIG. 13. This series capacitive coupling of the straps produced by the slots 25 has become known as the $C_{1-3}$ mode of coupling, and is especially useful in high power magnetron interaction for forward wave bar circuit amplifiers.

The vane coupled bar circuit of the present invention is useful in linear as well as circular tubes whether of the type O or M variety. However, the circuit because of its relatively low interaction impedance and high thermal capacity is well suited for type M tubes whether of the linear or circular geometry and is especially well suited for the circular geometry and particularly coaxial geometries.

Since many changes could be made in the above construction and many apparently widely different embodiments of this invention could be made without departing from the scope thereof, it is intended that all matter contained in the above description or shown in the accompanying drawings shall be interpreted as illustrative and not in the limiting sense.

What is claimed is:

1. A composite periodic circuit including, means forming an array of elongated first conductive elements, means for shorting together the common ends of said first elements at both ends thereof to define an array of half wavelength slot resonators in the spaces between said shorted adjacent first conductive elements, means forming an array of elongated second conductive elements, means for shorting together the common ends of said second elements at one end thereof, and means for connecting the other common ends of said array of second elements to respective ones of said first conductive elements intermediate the lengths of said first conductive elements, said second conductive elements defining in the spaces between adjacent ones thereof an array of quarter wavelength slot resonators, whereby energy coupling to said array of half wavelength slot resonators via said quarter wave resonators is facilitated.

2. The apparatus according to claim 1 wherein said first conductive elements are bars and said second conductive elements are selected from the class of bars and vanes.

3. The apparatus according to claim 1 wherein said composite circuit includes a pair of strapping wave supporting members connected to said array of first conductive elements and extending along the array of elements in the direction of circuit development, and wherein said strapping members are selected from the class of, straps connected to alternate bars, helices, contrawound helices, and series capacitively coupled straps connected to alternate ones of said first elements.

4. The apparatus according to claim 3 wherein said pair of strapping members are connected to said array of first elements on opposite sides of a plane passing through the centers of said elongated first elements and transverse to their longitudinal axes.

5. The apparatus according to claim 1 including means for providing a stream of charged particles adjacent said elongated array of first elements for cumulative electromagnetic interaction with the fields of said half wavelength slot resonators.

6. The apparatus according to claim 5 including means forming a circular electric mode wave supporting structure, and means for coupling the fields of the circular electric mode on said circular electric structure to the $\pi$ mode of wave energy on said array of half wavelength slot resonators via the intermediary of said array of quarter wave slot resonators.

7. The apparatus according to claim 6 wherein said circular electric structure is a cavity resonator and includes means for tuning the resonant frequency thereof, whereby the $\pi$ mode frequency of said half wavelength slot resonators is tuned in frequency.

8. The apparatus according to claim 6 wherein said circular electric structure is coaxially disposed of said array of first elements, and wherein said coupling means includes an array of axially directed coupling slots communicating between said circular electric structure and alternate ones of said array of quarter wave slot resonators.

References Cited

UNITED STATES PATENTS

| | | | |
|---|---|---|---|
| 2,889,486 | 6/1959 | Guenard et al. | 315—39.73 X |
| 2,939,035 | 5/1960 | Reverdin | 315—3.5 |
| 3,361,926 | 1/1968 | Farney | 315—3.5 |

ELI LIEBERMAN, *Primary Examiner.*

SAXFIELD CHATMON, Jr., *Assistant Examiner.*

U.S. Cl. X.R.

315—3.6; 333—31